(12) United States Patent
Poulle et al.

(10) Patent No.: US 8,226,301 B2
(45) Date of Patent: Jul. 24, 2012

(54) SUSPENSION THRUST BEARING DEVICE AND STRUT

(75) Inventors: Thierry Poulle, Neuvy le Roi (FR); Christophe Houdayer, Semblancay (FR); Jean-Sylvain Migliore, Tours (FR)

(73) Assignee: Aktiebolaget SKF, Göteborg (SE)

( * ) Notice: Subject to any disclaimer, the term of this patent is extended or adjusted under 35 U.S.C. 154(b) by 937 days.

(21) Appl. No.: 11/807,180

(22) Filed: May 25, 2007

(65) Prior Publication Data

US 2008/0031562 A1 Feb. 7, 2008

(30) Foreign Application Priority Data

Jun. 26, 2006 (FR) ..................... 06 05698

(51) Int. Cl.
*F16C 19/10* (2006.01)
*B60G 15/00* (2006.01)
(52) U.S. Cl. ................. 384/609; 280/124.145
(58) Field of Classification Search .................. 384/490, 384/510, 526, 536, 590, 592, 609, 611; 267/220, 267/170, 221; 280/124.145–124.147, 124.154, 280/124.155
See application file for complete search history.

(56) References Cited

U.S. PATENT DOCUMENTS

| | | | |
|---|---|---|---|
| 1,368,068 A | 2/1921 | Stein et al. | |
| 2,055,524 A | 9/1936 | Milford | |
| 2,140,975 A | 12/1938 | Welch | |
| 3,008,362 A | 11/1961 | Tucker | |
| 3,258,962 A | 7/1966 | Dahle | |
| 3,365,967 A | 1/1968 | Friedrich | |
| 3,951,482 A * | 4/1976 | Blaydon et al. | 384/485 |
| 3,965,565 A | 6/1976 | Fujii | |
| 4,018,318 A | 4/1977 | Hallerberg | |
| 4,020,720 A | 5/1977 | Fujii | |
| 4,029,186 A | 6/1977 | De Gennes | |
| 4,046,238 A | 9/1977 | Mendoza-Orozco | |
| 4,119,625 A | 10/1978 | Schmidlin | |
| 4,175,453 A | 11/1979 | Exner et al. | |
| 4,281,539 A | 8/1981 | Keller | |
| 4,319,220 A | 3/1982 | Pappas et al. | |
| 4,435,890 A | 3/1984 | Ernst et al. | |
| 4,438,901 A | 3/1984 | Reneau et al. | |

(Continued)

FOREIGN PATENT DOCUMENTS

DE 570710 2/1933

(Continued)

OTHER PUBLICATIONS

International Preliminary Report on Patentability for PCT/FR2006/000908, Oct. 23, 2007 (16 pages).

(Continued)

*Primary Examiner* — James Pilkington
(74) *Attorney, Agent, or Firm* — Meyertons, Hood, Kivlin, Kowert & Goetzel, P.C.; Eric B. Meyertons

(57) ABSTRACT

The suspension thrust bearing device, in particular for a motor vehicle, includes a rolling bearing forming an axial thrust bearing, a lower support cap of the rolling bearing that is provided with a body made of synthetic material, and a vibration-filtering element mounted on the body of the support cap. The filtering element includes at least one flange extending substantially radially and designed to form a flow deflector for reducing any ingress of water inside the rolling bearing.

10 Claims, 3 Drawing Sheets

U.S. PATENT DOCUMENTS

| | | | |
|---|---|---|---|
| 4,478,595 A | 10/1984 | Hayakawa et al. | |
| 4,494,637 A | 1/1985 | Gotoda et al. | |
| 4,497,523 A | 2/1985 | Lederman | |
| 4,505,484 A | 3/1985 | Ohkuma et al. | |
| 4,523,742 A | 6/1985 | Reneau | |
| 4,528,895 A | 7/1985 | Nakamura | |
| 4,541,744 A | 9/1985 | Lederman | |
| 4,601,374 A | 7/1986 | Ladin | |
| 4,602,875 A | 7/1986 | Doerr et al. | |
| 4,608,741 A | 9/1986 | Mallet | |
| 4,641,523 A | 2/1987 | Andreasson | |
| 4,699,530 A | 10/1987 | Satoh et al. | |
| 4,708,036 A | 11/1987 | Vossbrinck | |
| 4,722,617 A | 2/1988 | Stella et al. | |
| 4,732,494 A | 3/1988 | Guers et al. | |
| 4,815,867 A | 3/1989 | Ladin | |
| 4,854,436 A | 8/1989 | Lassiaz et al. | |
| 4,867,292 A | 9/1989 | Hartig | |
| 4,872,768 A | 10/1989 | Brandenstein et al. | |
| 4,874,073 A | 10/1989 | Tagawa | |
| 4,881,629 A | 11/1989 | Gay et al. | |
| 4,915,512 A | 4/1990 | Hilby et al. | |
| 4,939,936 A | 7/1990 | Spooner et al. | |
| 4,946,295 A | 8/1990 | Hajzler | |
| 4,957,133 A | 9/1990 | Linz et al. | |
| 4,970,945 A | 11/1990 | Schmidt | |
| 4,998,453 A | 3/1991 | Walton | |
| 5,008,647 A | 4/1991 | Brunt et al. | |
| 5,017,741 A | 5/1991 | Brown et al. | |
| 5,018,384 A | 5/1991 | Hayashi et al. | |
| 5,033,013 A | 7/1991 | Kato et al. | |
| 5,051,693 A | 9/1991 | Brauer | |
| 5,072,181 A | 12/1991 | Burger | |
| 5,198,738 A | 3/1993 | Blaser et al. | |
| 5,264,790 A | 11/1993 | Moretti et al. | |
| 5,372,435 A | 12/1994 | Genero et al. | |
| 5,377,580 A | 1/1995 | Merklein et al. | |
| 5,454,585 A | 10/1995 | Dronen et al. | |
| 5,467,971 A * | 11/1995 | Hurtubise et al. ............. 267/220 | |
| 5,523,681 A | 6/1996 | Hajzler et al. | |
| 5,570,871 A | 11/1996 | Westerfield | |
| 5,575,568 A | 11/1996 | Rigaux et al. | |
| 5,592,401 A | 1/1997 | Kramer | |
| 5,598,913 A | 2/1997 | Monahan et al. | |
| 5,620,209 A | 4/1997 | Sauer | |
| 5,657,544 A | 8/1997 | Ota et al. | |
| 5,713,577 A | 2/1998 | Lannert et al. | |
| 5,721,539 A | 2/1998 | Goetzl | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,011,491 A | 1/2000 | Goetzl | |
| 6,013,007 A | 1/2000 | Root et al. | |
| 6,025,737 A | 2/2000 | Patel et al. | |
| 6,035,990 A | 3/2000 | Peschke | |
| 6,043,643 A | 3/2000 | Message et al. | |
| 6,056,446 A | 5/2000 | Welter et al. | |
| 6,109,624 A | 8/2000 | Message et al. | |
| 6,129,643 A | 10/2000 | Tamagawa et al. | |
| 6,155,543 A | 12/2000 | Solomond et al. | |
| 6,160,480 A | 12/2000 | Su-yueh | |
| 6,196,552 B1 | 3/2001 | Peterson et al. | |
| 6,241,257 B1 | 6/2001 | Hauck et al. | |
| 6,267,512 B1 | 7/2001 | Beghini et al. | |
| 6,288,533 B1 | 9/2001 | Haeberli et al. | |
| 6,304,079 B1 | 10/2001 | Kenjo et al. | |
| 6,310,450 B1 | 10/2001 | Arrigo | |
| 6,323,640 B1 | 11/2001 | Forestiero et al. | |
| 6,328,148 B2 | 12/2001 | Winkelmann et al. | |
| 6,338,576 B1 | 1/2002 | Girardin et al. | |
| 6,357,926 B1 | 3/2002 | Hauck et al. | |
| 6,415,900 B1 | 7/2002 | Lopez et al. | |
| 6,417,075 B1 | 7/2002 | Haberger et al. | |
| 6,539,336 B1 | 3/2003 | Vock et al. | |
| 6,550,755 B2 * | 4/2003 | Ehrhardt et al. ............. 267/286 | |
| 6,558,043 B2 | 5/2003 | Beghini et al. | |
| 6,564,480 B1 | 5/2003 | Tomita et al. | |
| 6,593,733 B1 | 7/2003 | Nicot | |
| 6,611,138 B2 | 8/2003 | Vasiloiu | |
| 6,612,749 B2 | 9/2003 | Arnault et al. | |
| 6,666,784 B1 | 12/2003 | Iwamoto et al. | |
| 6,702,085 B1 | 3/2004 | Ponson | |
| 6,712,366 B1 | 3/2004 | Cargill | |
| 6,746,352 B1 | 6/2004 | Poiret et al. | |
| 6,814,496 B2 * | 11/2004 | Beghini et al. ................ 384/617 |
| 6,837,116 B2 | 1/2005 | Desbiolles | |
| 6,889,794 B2 | 5/2005 | Higashira et al. | |
| 6,908,229 B2 | 6/2005 | Landrieve et al. | |
| 6,923,461 B2 * | 8/2005 | Momose et al. ....... 280/124.155 |
| 7,033,080 B2 | 4/2006 | Landrieve et al. | |
| 7,033,293 B2 | 4/2006 | Serkh | |
| 7,114,853 B2 | 10/2006 | Debrailly et al. | |
| 7,117,986 B2 | 10/2006 | Thomire et al. | |
| 7,222,709 B2 | 5/2007 | Arnault | |
| 7,228,951 B2 | 6/2007 | Arnault | |
| 7,275,462 B2 | 10/2007 | Faus et al. | |
| 7,290,351 B2 | 11/2007 | Niarfeix et al. | |
| 7,367,714 B2 | 5/2008 | Niarfeix et al. | |
| 7,429,133 B2 | 9/2008 | Gallion et al. | |
| 2002/0026839 A1 | 3/2002 | Lehtovaara | |
| 2002/0038193 A1 | 3/2002 | Grunberg et al. | |
| 2002/0111767 A1 | 8/2002 | Lueschow et al. | |
| 2002/0112555 A1 | 8/2002 | Chikaraishi et al. | |
| 2002/0125113 A1 | 9/2002 | Bhakta et al. | |
| 2002/0126926 A1 | 9/2002 | Ohtsuki et al. | |
| 2002/0167306 A1 | 11/2002 | Zalunardo et al. | |
| 2002/0170812 A1 | 11/2002 | Calkin et al. | |
| 2002/0190709 A1 | 12/2002 | Frederick et al. | |
| 2003/0002764 A1 | 1/2003 | Pflugner et al. | |
| 2003/0007631 A1 | 1/2003 | Bolognesi et al. | |
| 2003/0137091 A1 | 7/2003 | Chesne | |
| 2004/0013334 A1 | 1/2004 | Landrieve et al. | |
| 2004/0015307 A1 | 1/2004 | Heisenberg | |
| 2004/0097313 A1 | 5/2004 | Singer | |
| 2004/0120620 A1 | 6/2004 | Landrieve | |
| 2004/0126431 A1 | 7/2004 | Ito | |
| 2004/0154895 A1 | 8/2004 | Thomire et al. | |
| 2004/0235599 A1 | 11/2004 | Ozorak et al. | |
| 2004/0254710 A1 | 12/2004 | Yano | |
| 2005/0008276 A1* | 1/2005 | Beghini et al. ................ 384/609 |
| 2005/0026729 A1 | 2/2005 | Schenk et al. | |
| 2005/0124447 A1 | 6/2005 | Message et al. | |
| 2005/0242542 A1* | 11/2005 | Handke et al. ......... 280/124.155 |
| 2005/0265646 A1 | 12/2005 | Arnault | |
| 2006/0011445 A1 | 1/2006 | Bussit et al. | |
| 2006/0104558 A1 | 5/2006 | Gallion et al. | |
| 2006/0115443 A1 | 6/2006 | Gesztesi et al. | |
| 2006/0188190 A1 | 8/2006 | Schmidl et al. | |
| 2006/0227007 A1 | 10/2006 | Landrieve | |
| 2006/0243150 A1 | 11/2006 | Landrieve | |
| 2007/0025655 A1 | 2/2007 | Barraud et al. | |
| 2007/0053622 A1 | 3/2007 | Gallion et al. | |
| 2007/0074945 A1 | 4/2007 | Ponson et al. | |
| 2008/0036454 A1 | 2/2008 | Landrieve | |
| 2008/0038564 A1 | 2/2008 | Bruel et al. | |
| 2008/0090686 A1 | 4/2008 | Gardelle | |
| 2008/0132365 A1 | 6/2008 | Boussaguet et al. | |
| 2008/0152272 A1 | 6/2008 | Debrailly et al. | |
| 2008/0167150 A1 | 7/2008 | Gaborel et al. | |
| 2008/0197552 A1* | 8/2008 | Winocur ..................... 267/195 |
| 2008/0230341 A1 | 9/2008 | Barraud et al. | |
| 2008/0248905 A1 | 10/2008 | Descombes et al. | |

FOREIGN PATENT DOCUMENTS

| | | |
|---|---|---|
| DE | 916370 | 8/1954 |
| DE | 1525294 | 2/1972 |
| DE | 7208788 | 5/1972 |
| DE | 2457863 | 6/1975 |
| DE | 2729699 | 12/1978 |
| DE | 3534462 | 4/1987 |
| DE | 3910498 | 10/1990 |
| DE | 4228899 | 3/1994 |
| DE | 9418459 | 2/1995 |
| DE | 29609380 | 8/1996 |
| DE | 29708535 | 8/1997 |
| DE | 19637585 | 3/1998 |

| | | |
|---|---|---|
| DE | 19809074 | 1/1999 |
| DE | 19836191 | 2/2000 |
| DE | 10041095 | 6/2001 |
| DE | 10011820 | 9/2001 |
| DE | 10035488 | 1/2002 |
| DE | 10036765 | 2/2002 |
| DE | 10042677 | 3/2002 |
| DE | 10058623 | 6/2002 |
| DE | 10148388 | 4/2003 |
| DE | 102004013669 | 10/2005 |
| DE | 4300083 | 11/2008 |
| EP | 0375019 | 6/1990 |
| EP | 0395783 | 11/1990 |
| EP | 399855 | 11/1990 |
| EP | 456142 | 11/1991 |
| EP | 0511105 | 10/1992 |
| EP | 0520853 | 12/1992 |
| EP | 0806851 | 11/1997 |
| EP | 0823267 | 2/1998 |
| EP | 0890753 | 1/1999 |
| EP | 0930505 | 7/1999 |
| EP | 0992797 | 4/2000 |
| EP | 1120584 | 8/2001 |
| EP | 1146244 | 10/2001 |
| EP | 1236934 | 9/2002 |
| EP | 1445129 | 8/2004 |
| EP | 1491786 | 12/2004 |
| FR | 2375484 | 12/1977 |
| FR | 2574501 | 6/1986 |
| FR | 2577291 | 8/1986 |
| FR | 2602872 | 2/1988 |
| FR | 2611244 | 8/1988 |
| FR | 2630375 | 10/1989 |
| FR | 2655735 | 6/1991 |
| FR | 2667947 | 4/1992 |
| FR | 2688560 | 9/1993 |
| FR | 2703450 | 10/1994 |
| FR | 2744506 | 8/1997 |
| FR | 2751392 | 1/1998 |
| FR | 2772444 | 6/1999 |
| FR | 2799694 | 4/2001 |
| FR | 2808325 | 11/2001 |
| FR | 2819864 | 7/2002 |
| FR | 2848663 | 6/2004 |
| FR | 2856759 | 12/2004 |
| FR | 2863706 | 6/2005 |
| FR | 2867421 | 9/2005 |
| FR | 2882139 | 8/2006 |
| GB | 1580301 | 12/1980 |
| GB | 2156084 | 2/1981 |
| GB | 2156082 | 10/1985 |
| GB | 2201745 | 9/1988 |
| GB | 2259962 | 3/1993 |
| GB | 2313417 | 11/1997 |
| GB | 2347906 | 9/2000 |
| JP | 62278352 | 12/1987 |
| JP | 10030693 | 2/1988 |
| JP | 63172052 | 7/1988 |
| JP | 06058770 | 3/1994 |
| JP | 6213251 | 8/1994 |
| JP | 08054205 | 2/1996 |
| JP | 09292006 | 4/1996 |
| JP | 9072394 | 3/1997 |
| JP | 09229097 | 9/1997 |
| JP | 11247972 | 9/1999 |
| JP | 2000161471 | 6/2000 |
| JP | 2000209889 | 7/2000 |
| JP | 2000241197 | 9/2000 |
| JP | 2001289291 | 10/2001 |
| JP | 2004011827 | 1/2004 |
| JP | 2005282856 | 10/2005 |
| JP | 2006183755 | 7/2006 |
| WO | 9850709 | 11/1998 |
| WO | 0000755 | 1/2000 |
| WO | 0142809 | 5/2001 |
| WO | 02052280 | 7/2002 |
| WO | 02071076 | 9/2002 |
| WO | 03067107 | 8/2003 |
| WO | 2004005937 | 1/2004 |

OTHER PUBLICATIONS

Written Opinion of the International Search Authority for PCT/FR2006/000908, Oct. 22, 2007 (14 pages).

French Preliminary Search Report for FR 0654418, Mar. 28, 2007 (2 pages).

French Preliminary Search Report for FR 0655556, Aug. 1, 2007 (2 pages).

French Preliminary Search Report for FR 0753542, Nov. 7, 2007 (2 pages).

French Preliminary Search Report for FR 0754038, Dec. 21, 2007 (2 pages).

French Preliminary Search Report for FR 0754582, Feb. 1, 2008 (2 pages).

International Search Report for PCT/FR2006/002769, mailed Apr. 25, 2007 (4 pages).

International Preliminary Report on Patentability for PCT/FR2006/002769, Jun. 24, 2008 (12 pages).

Written Opinion of the International Search Authority for PCT/FR2006/002769, Jun. 20, 2008 (10 pages).

French Preliminary Search Report for FR 0756272, Feb. 14, 2008 (2 pages).

International Search Report for PCT/FR2007/000001, mailed Oct. 16, 2007 (4 pages).

International Preliminary Report on Patentability for PCT/FR2007/000001, Jul. 8, 2008 (6 pages).

Written Opinion of the International Search Authority for PCT/FR2007/000001, Jul. 6, 2008 (5 pages).

French Preliminary Search Report for FR 0312354, Apr. 21, 2004 (1 page).

French Preliminary Search Report for FR651486, Feb. 4, 2005 (1 page).

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

"Federbeinlagerung für Kraftfahrzeug", May 31, 1972, 6 pages. (German).

International Search Report PCT/FR 02/03077, mailed Jan. 21, 2003 (4 pages).

International Preliminary Examination Report for PCT/FR02/03077, Apr. 24, 2003 (4 pages).

U.S. Patent and Trademark Office, "Communication" for U.S. Appl. No. 10/488,911, mailed Dec. 10, 2007.

U.S. Patent and Trademark Office, "Communication" for U.S. Appl. No. 10/488,911, mailed Apr. 23, 2008.

U.S. Patent and Trademark Office, "Communication" for U.S. Appl. No. 10/488,911, mailed Aug. 19, 2008.

French Preliminary Search Report for FR 0114669, Sep. 2, 2002 (3 pages).

International Search Report for PCT/FR02/03867, mailed Apr. 4, 2003 (6 pages).

International Preliminary Examination Report for PCT/FR02/03867, Mar. 12, 2004 (17 pages).

U.S. Patent and Trademark Office, "Communication" for U.S. Appl. No. 10/495,496, mailed Jun. 23, 2008.

French Preliminary Search Report for FR 0311989, Feb. 24, 2004 (2 pages).

U.S. Patent and Trademark Office, "Communication" for U.S. Appl. No. 10/965,679, mailed Jan. 15, 2008.

U.S. Patent and Trademark Office, "Communication" for U.S. Appl. No. 10/965,679, mailed May 14, 2008.

International Search Report for PCT/FR03/02113, mailed Nov. 27, 2003 (4 pages).

International Preliminary Examination Report for PCT/FR03/02113, Apr. 26, 2004 (8 pages).

French Preliminary Search Report for FR 0407390, Feb. 4, 2005 (1 page).

U.S. Patent and Trademark Office, "Communication" for U.S. Appl. No. 11/175,013, mailed Apr. 2, 2007.

U.S. Patent and Trademark Office, "Communication" for U.S. Appl. No. 11/175,013, mailed Aug. 16, 2007.

U.S. Patent and Trademark Office, "Communication" for U.S. Appl. No. 11/175,013, mailed Dec. 17, 2007.
U.S. Patent and Trademark Office, "Communication" for U.S. Appl. No. 11/175,013, mailed May 28, 2008.
U.S. Patent and Trademark Office, "Communication" for U.S. Appl. No. 11/175,013, mailed Sep. 18, 2008.
International Search Report for PCT/FR04/000639, mailed Oct. 12, 2004 (2 pages).
International Preliminary Report on Patentability for PCT/FR04/000639, Feb. 28, 2005 (11 pages).
Written Opinion of the International Search Authority for PCT/FR2004/000639, Oct. 26, 2004 (5 pages).
U.S. Patent and Trademark Office, "Communication" for U.S. Appl. No. 10/548,866, mailed Oct. 9, 2007.
International Search Report for PCT/FR2004/001557, mailed Jan. 5, 2005 (6 pages).
Written Opinion of the International Search Authority for PCT/FR2004/001557, Jan. 3, 2005 (11 pages).
International Preliminary Report on Patentability for PCT/FR2004/001557, Jan. 3, 2006 (13 pages).
International Search Report for PCT/FR04/001609, mailed Dec. 3, 2004 (6 pages).
French Preliminary Search Report for FR 0309239, Apr. 16, 2004 (2 pages).
Written Opinion of the International Search Authority for PCT/FR2004/001609, Dec. 2, 2004 (11 pages).
International Preliminary Report on Patentability for PCT/FR2004/001609, Jan. 30, 2006 (13 pages).
French Preliminary Search Report for FR 0502005, Oct. 3, 2005 (3 pages).
U.S. Patent and Trademark Office, "Communication" for U.S. Appl. No. 11/361,306, mailed Aug. 19, 2008.
International Search Report for PCT/FR2004/002542, mailed Jun. 28, 2005 (6 pages).
Written Opinion of the International Search Authority for PCT/2004/002542, Jun. 24, 2005 (6 pages).
International Preliminary Report on Patentability for PCT/FR2004/002542, Oct. 25, 2005 (11 pages).
U.S. Patent and Trademark Office, "Communication" for U.S. Appl. No. 11/536,105, mailed Apr. 20, 2007.
U.S. Patent and Trademark Office, "Communication" for U.S. Appl. No. 11/536,105, mailed Oct. 3, 2007.
U.S. Patent and Trademark Office, "Communication" for U.S. Appl. No. 11/536,105, mailed Aug. 1, 2008.
French Preliminary Search Report for FR 0507997, Apr. 13, 2006 (2 pages).
U.S. Patent and Trademark Office, "Communication" for U.S. Appl. No. 11/484,321, mailed Sep. 17, 2008.
French Preliminary Search Report for FR 0605698, Jan. 23, 2007 (2 pages).
International Search Report for PCT/FR2006/000349, mailed Jun. 26, 2006 (4 pages).
Written Opinion of the International Search Authority for PCT/FR2006/000349, Sep. 3, 2007 (10 pages).
International Preliminary Report on Patentability for PCT/FR2006/000349, Aug. 21, 2007 (6 pages).
French Preliminary Search Report for FR 0654056, Mar. 29, 2007 (2 pages).
French Preliminary Search Report for FR 0654082, May 9, 2007 (2 pages).
International Search Report for PCT/FR2006/000908, mailed Jul. 20, 2007 (6 pages).

* cited by examiner

SUSPENSION THRUST BEARING DEVICE AND STRUT

BACKGROUND OF THE INVENTION

1. Field of the Invention

The present invention relates to the field of suspension thrust bearing devices used, in particular, in the suspension struts of the steered wheels of motor vehicles.

2. Description of the Relevant Art

Conventionally, a suspension thrust bearing is provided with an upper race and a lower race, between which rolling elements are arranged, and with lower and upper bearing or support elements, such as caps, forming housings for the lower and upper races of the rolling bearing respectively.

A suspension thrust bearing is arranged in the upper part of the suspension strut between a suspension spring and an upper element which is fixed to the vehicle body. The suspension spring is arranged around a damper piston rod whose end can be secured to the vehicle body. The spring bears axially, directly or indirectly, on the lower support cap of the rolling bearing.

The suspension thrust bearing thus makes it possible to transmit axial forces between the suspension spring and the vehicle body while permitting a relative angular movement between the lower cap, which can move rotationally, and the upper cap. This relative angular movement can result from the steered wheels being turned and/or from the suspension spring being compressed.

Document GB-A-2 347 906 discloses a suspension thrust bearing provided with a support cap and with a rolling bearing mounted on the support cap.

The support cap is made of synthetic material, and includes an axial centering surface for a suspension spring, this surface being extended outwardly at its upper end by a helical surface forming a stop for the upper end turn of the spring.

This suspension thrust bearing has the disadvantage of including a support cap on which the upper end of the spring bears directly. Thus, the vibrations of the spring are transmitted to the motor vehicle body via the support cap, this being detrimental to vehicle comfort.

With the aim of limiting these phenomena, it is desirable for such vibrations to be absorbed, at least in part.

In this respect, and as illustrated in FIG. 2 of document FR-A-2 809 675, it is possible to provide a suspension thrust bearing having a flexible elastomeric baseplate mounted on the support cap and provided with a bearing surface for the spring.

However, such a suspension thrust bearing has certain disadvantages.

Specifically, a suspension thrust bearing is generally exposed to various kinds of pollution, especially to splashing water droplets when the motor vehicle is traveling along a wet road, these droplets being directed towards the thrust bearing by the aerodynamic turbulence generated by the movement of the vehicle.

However, with the suspension thrust bearing provided in that document, such water droplets can easily be directed towards the rolling bearing and be introduced inside the latter.

Under these conditions, it will readily be appreciated that there are thus significant risks of polluting elements, which can lead to possible malfunctioning, being introduced inside the suspension thrust bearing.

SUMMARY OF THE INVENTION

It is therefore desirable to overcome the disadvantages of these prior systems. Furthermore, it is desirable to provide a suspension thrust bearing device which is relatively inexpensive and has good operational reliability. Additionally, it is desirable to provide a suspension thrust bearing device which ensures excellent sealing while having a low number of parts. Finally, it is desirable to provide a suspension thrust bearing device which allows vibrations to be filtered in part while providing good sealing inside this device.

According to a first embodiment, a suspension thrust bearing device, in particular for a motor vehicle, is described. The suspension thrust bearing device includes a rolling bearing forming an axial thrust bearing, a lower support cap of the rolling bearing that is provided with a body made of synthetic material, and a vibration-filtering element mounted on the body of the support cap.

According to a general feature, the filtering element includes at least one flange extending substantially radially and designed to form a flow deflector for reducing any ingress of water inside the rolling bearing.

In other words, the flange or flanges extend substantially radially beyond the body of the lower support cap.

With such a device, a suspension thrust bearing is obtained which includes an element designed to filter the vibrations in part and to orient the water particle-carrying airflows away from the region where the rolling bearing of the suspension thrust bearing is situated.

Specifically, the flange of the filtering element makes it possible to interrupt the air flow present in the area surrounding the thrust bearing in such a way as to prevent the presence of a flow directed towards the rolling bearing. Thus, the risk of polluting elements intruding inside the rolling bearing is particularly limited.

In other words, a single element makes it possible to provide a function of vibration damping and a function of diverting the direction of at least one air stream.

Advantageously, the filtering element includes a first flange which radially outwardly extends a radial portion of the filtering element.

The first flange can extend radially beyond the periphery of the body of the lower support cap.

Preferably, the filtering element includes a second flange arranged around the bore of the filtering element and directed radially inwards.

The use of a filtering element provided with first and second flanges makes it possible to obtain a thrust bearing having increased operational reliability. Specifically, the combined use of these two flanges makes it possible to prevent the ingress of water droplets inside the thrust rolling bearing.

Advantageously, the second flange has a bore diameter which is less than the bore diameter of the lower support cap.

Preferably, the device additionally includes a cup provided with a bearing surface for a damping buffer. The second flange extends radially in the direction of the cup so as to form a gap seal.

In one embodiment, the device includes a stiffening reinforcement mounted against the filtering element and forming, together with the said element, a vibration-filtering and stress-distributing subassembly.

With such a subassembly, it becomes possible to filter the vibrations in part while ensuring good resistance to the axial forces exerted by the suspension spring.

Specifically, the arrangement of a stiff reinforcement mounted bearing against the flexible filtering element makes it possible for the load applied by the spring to be distributed to the lower support cap so as to significantly reduce the risks of the support cap cracking.

In other words, the presence of a subassembly which is separate from the lower cap and which is mounted to bear against the latter makes it possible to increase the reliability of the suspension thrust bearing while, in addition to the flow deflector function, providing vibration-damping and stress-distributing functions.

In a first variant, a radial portion of the filtering element is arranged axially between the lower support cap and the stiffening reinforcement.

The filtering element can be overmolded onto the stiffening reinforcement.

In a second variant, a radial portion of the stiffening reinforcement is arranged axially between the lower support cap and the filtering element.

In a preferred embodiment, the filtering element is obtained by molding at least one synthetic material.

According to a second embodiment, a strut, in particular for a motor vehicle, is described. The strut includes a damper and a suspension thrust bearing device as described above.

BRIEF DESCRIPTION OF THE DRAWINGS

The present invention will be better understood on reading the detailed description of embodiments which are given by way of non-limiting examples and illustrated by the appended drawings, in which.

Figure 1:
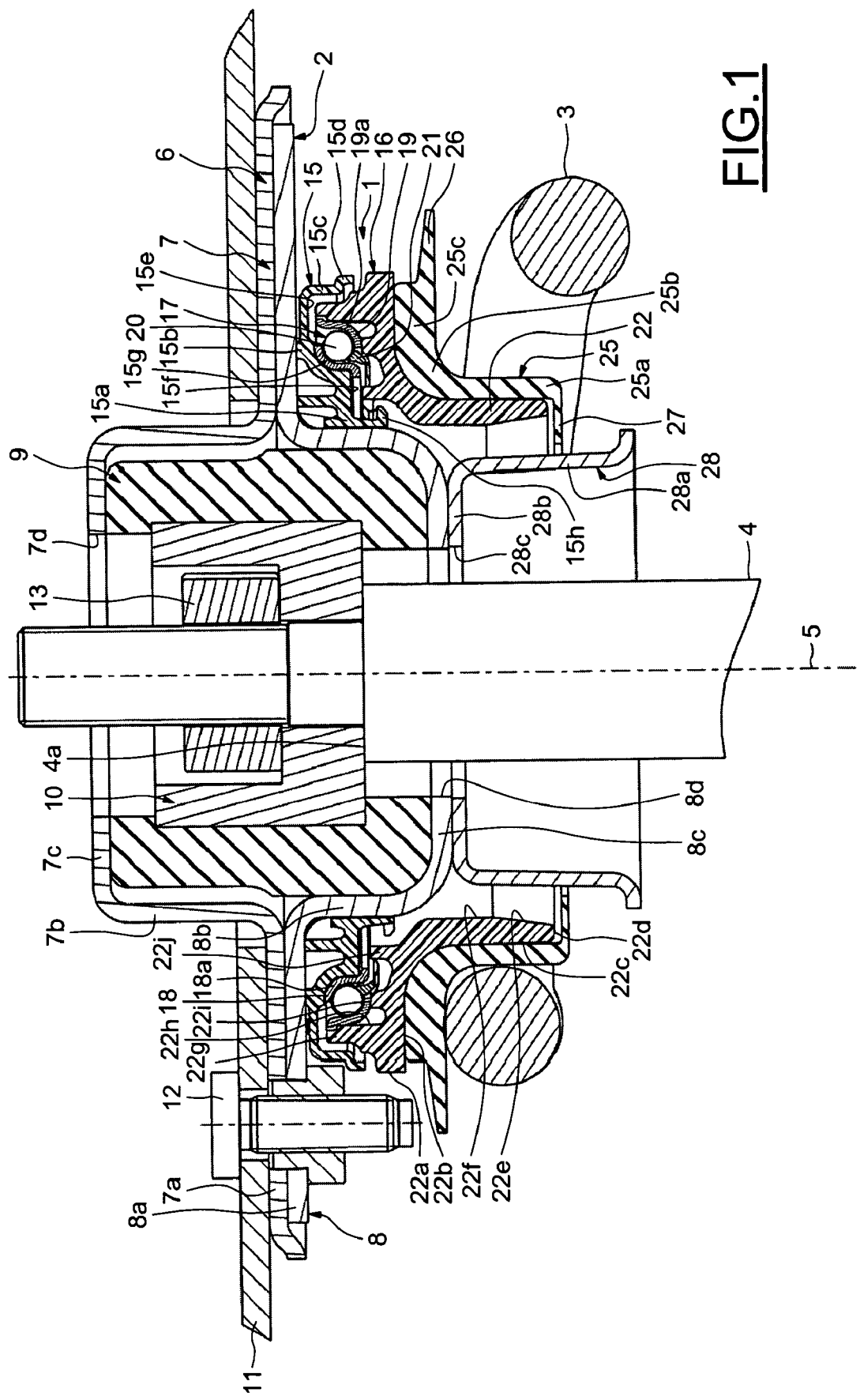
FIGS. 1 to 3 are views in axial section of the upper part of a suspension system of a motor vehicle including a thrust-bearing device according to various embodiments.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

FIG. 1 shows a suspension thrust bearing device, denoted by the general reference number 1, which is mounted between an upper bearing seat 2 and a helical-type spring 3.

The suspension thrust bearing 1 is arranged around a damper rod 4 of substantially vertical axis 5, the said rod being prolonged axially in the form of a cylinder of revolution, the spring 3 being mounted around the said rod.

The bearing seat 2 is provided with an annular connecting element 6 produced with two cups, an upper cup 7 and a lower cup 8, mounted to bear axially with respect to one another; with a rubber block 9 arranged axially between the cups; and with an annular inner connecting element 10 serving to secure the rubber block 9 to the damper rod 4.

The upper bearing cup 7, whose thickness is constant, includes a radial portion 7a in contact on its upper side with a chassis 11 of the vehicle, the said radial portion being extended upwardly from its inner end by an axial portion 7b, itself extended radially inwards at its upper end by a curved portion, and then by a radial portion 7c. The radial portion 7c includes a bore 7d designed to allow the passage of the damper rod 4.

The annular bearing cup 8, whose thickness is constant, for its part includes a radial portion 8a in contact on its upper side with the radial portion 7a of the upper cup 7. The radial portion 8a is extended, from a small-diameter edge, by a downwardly extending axial portion 8b, itself extended radially inwards by a curved portion, and then by a radial portion 8c. The radial portion 8c includes a bore 8d designed to allow the passage of the damper rod 4. The connecting element 6, essentially including the two cups 7 and 8, is fastened to the chassis 11 by fastening means, such as bolts 12.

The bearing cups 7 and 8 are advantageously obtained in a particularly economic manner from a sheet metal blank following cutting and stamping operations.

The annular rubber block 9 bears at one end against the lower surface of the radial portion 7c of the upper cup 7 and, at the opposed axial end, against the upper surface of the radial portion 8c of the lower cup 8. The rubber block 9 also bears against the inner surface of the radial portion 8b of the cup 8.

The rubber block 9 is clamped axially between the radial portions 7c and 8c of the cups 7 and 8 so as to produce an axial connection with vibration filtering between the damper rod 4 and the chassis 11.

In this respect, the inner connecting element 10, made of steel for example, bears against a shoulder 4a of the damper rod 4 in order to obtain the relative positioning between the rubber block 9 and the rod 4. Specifically, the rubber block 9 is advantageously overmolded onto the inner connecting element 10. To ensure that the said connecting element 10 is fastened axially on the damper rod 4, a nut 13 is mounted and bears against the said connecting element.

The suspension thrust bearing 1 includes an upper support cap 15, a lower support cap 16, and a rolling bearing 17 arranged axially between the said caps.

The upper cap 15 may consist of a one-piece component made of plastic, for example of polyamide PA 6.6 optionally reinforced with glass fibers. The upper cap 15 is provided with an internal axial skirt 15a which is centered on the outer surface of the axial portion 8b of the lower cup 8, and with a radial portion 15b which extends the internal axial skirt 15a and comes into contact against the lower surface of the radial portion 8a of the said cup 8.

The upper cap 15 is also provided with an external axial skirt 15c, of small thickness and large diameter, extending axially downwards from a large-diameter edge of the radial portion 15b, itself extended radially outwards by a radial portion, and then by an axial portion 15d of small size.

The skirts 15a and 15c are connected to one another by two annular radial surfaces, one large-diameter surface 15e and one small-diameter surface 15f. The radial annular surfaces 15e and 15f are connected by a surface 15g of substantially rounded shape.

A hook 15h, which may be circularly continuous or discontinuous, is here formed on the external edge of the internal axial skirt 15a, at its lower end. The hook 15h is directed radially outwards towards the lower cap 16.

The rolling bearing 17 includes an upper race 18 made of stamped sheet metal, a lower race 19, also made of stamped sheet metal, and a row of rolling elements 20, here provided in the form of balls. To enable a uniform circumferential space to be maintained between the rolling elements 20, the rolling bearing 17 also includes a cage 21.

The rolling elements 20 are arranged between raceways formed by the upper race 18 and lower race 19. Advantageously, the said races can be obtained from the same sheet metal blank by cutting and stamping, owing to the fact that the outside diameter of the upper race 18 is substantially equal to the inside diameter of the lower race 19.

The upper race 18 has a steroidal portion 18a which is in contact with the rounded surface 15g of the upper cap 15 and which extends in the vicinity of a part of the small-diameter annular radial surface 15f of the upper cap 15. The lower surface of the toroidal portion 18a forms the raceway for the rolling elements 20.

The lower race 19 also has a toroidal portion 19a whose upper surface forms the raceway for the rolling elements 20. The toroidal portion 19a is in contact with the lower cap 16. The rolling bearing 17 is completely arranged radially between the skirts 15a and 15c of the upper cap 15.

The lower cap 16 includes a body 22 made of plastic synthetic material, for example of the same material as the upper cap 15. The body 22 has, on its periphery, a cylindrical outer surface 22a of small axial size, from whose lower end extends a generally radial surface 22b which extends inwards by a rounded surface, and then by an axial surface 22c.

Extending inwards from the lower end of the axial surface 22c is a radial annular surface 22d. Extending upwards from the small-diameter edge of the radial surface 22d is a frusto-conical surface 22e, itself extended axially upwards by an axial surface 22f. The surfaces 22e and 22f form the bore of the lower cap 16.

Starting from an upper end of the cylindrical axial surface 22a, the body 22 additionally includes an axial annular rib 22g extending in the direction of the large-diameter annular surface 15e of the upper cap 15, into the vicinity of this surface. Thus, the rib 22g and the surface 15e form a gap seal so as to protect the rolling bearing 17 from any water thrown up when the vehicle provided with such a thrust bearing is traveling along a wet road.

Starting from the small-diameter edge of the rib 22g, the body 22 includes an axial surface 22a which is partly in contact with the toroidal portion 19a of the lower race 19, which is extended inwards by a rounded surface, itself extended by a radial surface 22i in contact with the said toroidal portion 19a.

The body 22 also includes an internal annular rib 22j offset axially inwards when considering the radial surface 22i. The rib 22j extends axially in the direction of the small-diameter radial surface 15f, into the vicinity thereof. It is also arranged radially in the vicinity of the hook 15h of the upper cap 15. Thus, the rib 22j forms, together with the radial surface 15f and the hook 15h, gap seals so as to limit the intrusion of various foreign bodies or polluting elements towards the rolling bearing 17.

To enable vibrations to be filtered, the suspension thrust bearing 1 also includes a filtering element 25 mounted axially so as to bear against the surfaces 22b and 22c of the body 22 of the lower cap 16.

The filtering element 25 is made of relatively flexible plastic synthetic material, for example of polyurethane or of nitrile rubber. It includes an axial portion 25a bearing against the axial surface 22c of the body 22 of the lower cap 16, which is extended outwards from an upper end by a rounded portion 25b whose shape substantially corresponds to the rounded portion connecting the surfaces 22b and 22c of the body 22.

The rounded portion 25b is extended, from a large-diameter edge, radially outwards by a radial portion 25c whose free end is here offset radially inwards with respect to the cylindrical surface 22a.

The axial portion 25a of the filtering element 25 allows the spring 3 to be centered on the suspension thrust bearing 1, while the radial portion 25c forms a bearing surface for the said spring.

To prevent any ingress of water inside the thrust bearing 1, and inside the rolling bearing 17, the filtering element 25, which is produced as a single piece, also includes first and second annular flanges 26, 27.

The first flange 26 extends the radial portion 25c radially outwards in part, starting from a large diameter edge. The first flange 26 extends radially outwards beyond the outer surface 22a or beyond the periphery of the body 22 of the lower cap 16. The lower surface of the first flange 26 extends substantially radially outwards the bearing surface for the spring 3 formed by the radial portion 25c.

The radial dimension of the flange 26 is substantially equal to that of the radial portion 25c. Specifically, the applicant has determined that, with such a dimension, the first flange 26 makes it possible substantially to limit any splashes of water directed towards the rolling bearing 17.

In other words, this flange 26 constitutes a radially outwardly directed lip which forms a flow deflector against which are broken up any splashes of water thrown up in the direction of the rolling bearing 17.

The annular second flange 27 is arranged, for its part, on the internal edge of the axial portion 25a of the filtering element 25, at its lower end. The second flange 27 extends radially inwards in the direction of a lower cup 28, into the vicinity thereof. The diameter of the bore of the second flange 27 is smaller than the bore 22f of the lower cap 16 and is very slightly larger than the outside diameter of the axial portion of the cup 28. The flange 27 thus extends radially inwards beyond the bore 22f of the body 22 of the lower cap 16. Hence, the flange 27 forms a gap seal with the said cup, and prevents the intrusion of various polluting elements in the direction of the rolling bearing 17.

The second flange 27 thus constitutes a lip forming a flow deflector for diverting the direction of the air stream which tends to enter between the body 22 of the lower cap 16 and the cup 28.

Specifically, the second flange 27 is here situated axially below the radial surface 22d of the body 22 and extends radially inwards into the vicinity of the cup 28.

The rigid cup 28 made of sheet steel, for example, is annular in shape and has a constant thickness. It includes an axial portion 28a whose outer surface forms, together with the flange 27 of the filtering element 25, the aforementioned gap.

The axial portion 28a is extended from the upper end and inwards by a rounded portion and then by a radial portion 28b in contact, at its upper surface, with the radial portion 8c of the cup 8.

The radial portion 28b, whose shape corresponds to the radial portion 8c, allows good distribution and good transmission of the axial forces from a damping buffer (not shown) which is intended to be mounted inside the cup 28, thereby being arranged around the damper rod 4. The lower surface of the radial portion 28b forms a stop surface or bearing surface for the said damping buffer. The radial portion 28b includes a bore 28c designed to allow the passage of the damper rod 4. The cups 8 and 28 bear one against the other by their respective radial portion 8c and 28b and are mechanically connected to one another by suitable means.

This embodiment is advantageous insofar as the suspension spring 3 bears directly against the element 25 so as to obtain satisfactory filtration of the vibrations. This same element, by virtue of the first and second flanges 26 and 27, also makes it possible to obtain increased sealing of the rolling bearing 17 of the suspension thrust bearing 1.

Figure 2:
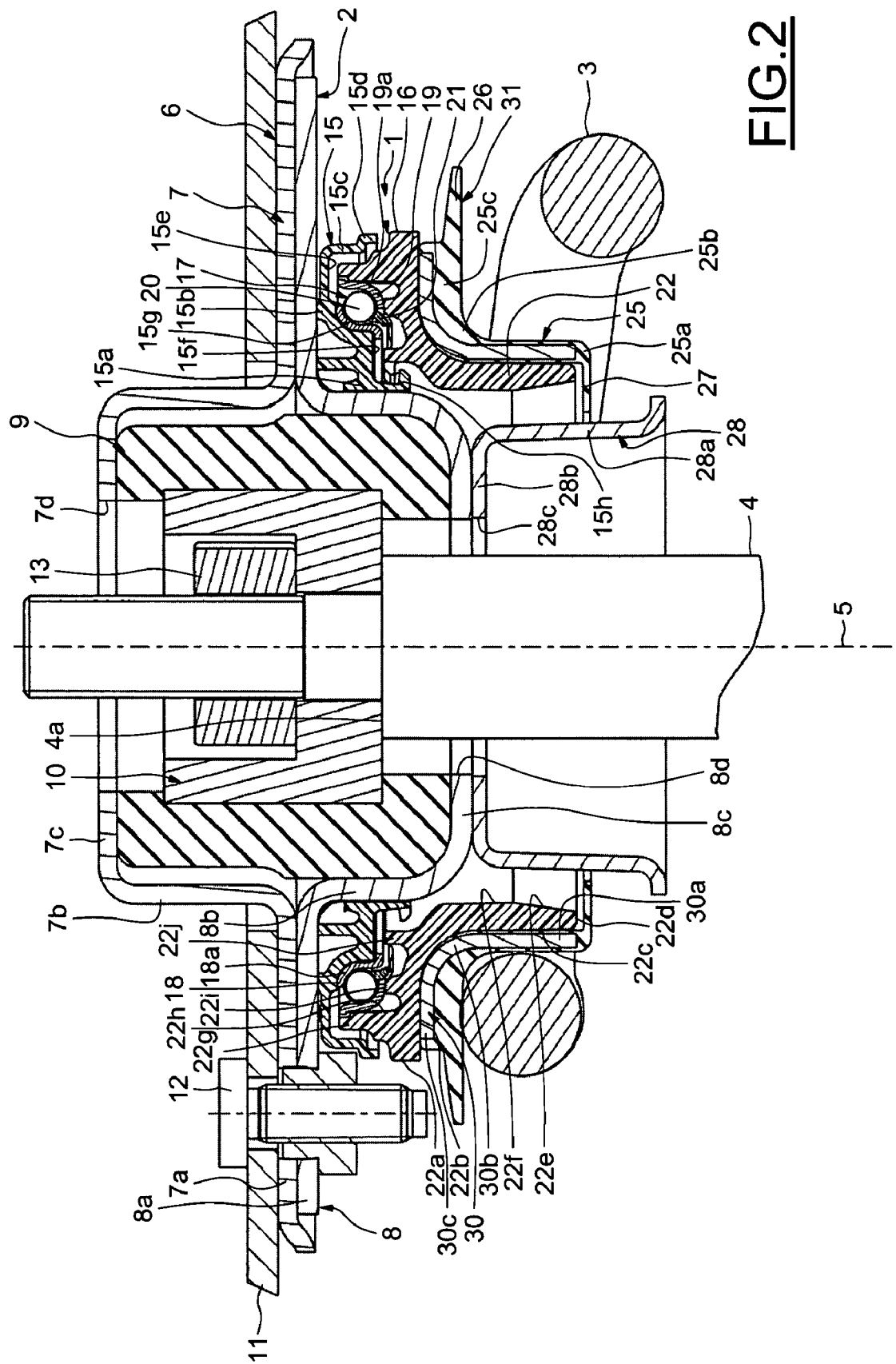

In the variant embodiment illustrated in FIG. 2, in which identical elements bear the same references, the suspension thrust bearing 1 also includes a stiffening reinforcement 30 for the filtering element 25.

The stiffening reinforcement 30 is here mounted semi-embedded inside the filtering element 25. It takes the form of a relatively thick steel cup in order to ensure sufficient stiffness.

The reinforcement 30, which is generally annular in shape, has a general L-shape in cross section. It can be obtained, for example, from a sheet metal blank by cutting and stamping.

It includes an axial portion 30a entirely embedded inside the axial portion 25a of the filter element 25, which is extended outwards from an upper end by a rounded portion 30b whose shape substantially corresponds to the rounded portion 25b of the filtering element 25.

The rounded portion 30b is extended, from a large-diameter edge, radially outwards by a radial portion 30c whose free end is here offset radially inwards with respect to the free end of the radial portion 25c of the filtering element 25. The portions 30b and 30c are substantially flush with the upper surfaces of the portions 25b and 25c so as to come into contact against the rounded surface and the radial surface 22b of the lower cap 16. Thus, the radial portion 30c of the stiffening reinforcement 30 is situated axially between the lower support cap 16 and the filtering element 25.

As a variant, it is readily conceivable to provide a stiffening reinforcement 30 which is entirely embedded inside the filtering element 25.

In another variant, it is also possible to mount the reinforcement 30 such that it bears against the upper surface of the filtering element 25. Under these conditions, the stiffening reinforcement 30 is mounted axially between the filtering element 25 and the lower cap 16, thereby being in contact against these two elements.

The filtering element 25 and the stiffening reinforcement 30 constitute a damping and stress-distributing subassembly 31.

Specifically, the presence of a stiffening reinforcement 30 mounted bearing against the filtering element 25 makes it possible to distribute the load applied by the spring 3 to the filtering element 25 and the lower support cap 16 and thus to substantially reduce any risks of deterioration of these elements.

Advantageously, the filtering element 25 is overmolded onto the stiffening reinforcement 30, these two elements thus being rendered integral with one another.

According to other connecting methods, the filtering element 25 and the stiffening reinforcement 30 are connected by adhesive bonding or mechanically. In that case, the filtering element 25 is manufactured separately by molding and then mounted on the stiffening reinforcement 30.

Figure 3:
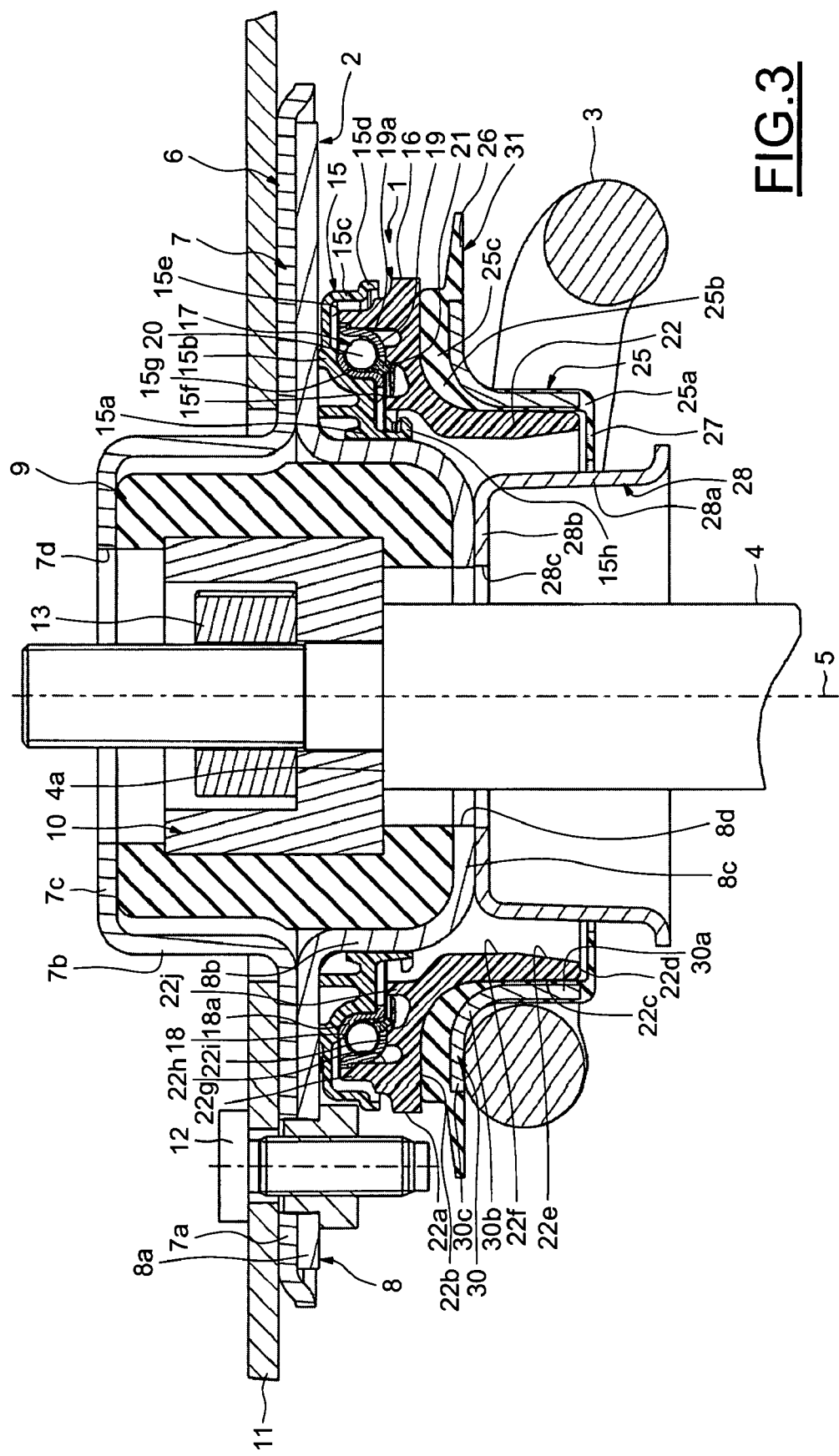

The variant embodiment illustrated in FIG. 3, in which identical elements bear the same references, differs from the above-described embodiment in that the stiffening reinforcement 30 is arranged such that the lower surfaces of the rounded portion 30b and of the radial portion 30c are substantially flush with the lower surfaces of the rounded portion 25b and of the radial portion 25c of the filtering element 25. Thus, the radial portion 25c of the filtering element 25 is situated axially between the lower support cap 16 and the stiffening reinforcement 30. The lower surface of the radial portion 30c here forms a bearing surface for the spring 3.

As a variant, it is also conceivable to provide a stiffening reinforcement 30 mounted such that it bears against the lower surface of the filtering element 25. Thus, the stiffening reinforcement 30 is mounted axially between the filtering element 25 and the spring 3.

In this manner, it is possible in a simple manner to produce a suspension thrust bearing device including a lower cap provided with a vibration-filtering element of flexible synthetic material that is provided with at least one lip forming a flow deflector in order to limit the intrusion of polluting elements inside the thrust rolling bearing.

Indeed, although provision is made in the above-described embodiments for a filtering element 25 to be provided with first and second flanges 26, 27 or lips, it will readily be appreciated that it is also possible, without departing from the scope of the invention, to provide a filtering element 25 which includes only one of these two flanges 26, 27.

However, with a filtering element 25 provided with a first external lip 26 and a second internal lip 27, the efficiency of diverting any splashes of water and polluting agents is increased, since these two lips form a barrier for diverting the splashes of water directed between the external axial skirt 15c of the upper cap 15 and the lower cap 16, and between this lower cap and the cup 28, respectively.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A suspension thrust bearing device comprising:
   a rolling bearing forming an axial thrust bearing,
   a lower support cap of the rolling bearing that is provided with a body made of synthetic material having an axial bore,
   a vibration-filtering element mounted on the body of the lower support cap, the vibration-filtering element being made of flexible plastic material to filter the vibrations of a suspension spring, and
   wherein the vibration-filtering element comprises:
      a radial portion forming a bearing surface for an upper end of the suspension spring;
      a first annular lip extending substantially radially outwardly from the bearing surface of the radial portion and beyond the upper end of the suspension spring and the body of the lower support cap, said annular lip extending entirely around the periphery of said body of the lower support cap and said upper end of the suspension spring and being designed to form a flow deflector for reducing any ingress of water inside the rolling bearing;
      a cup provided within the axial bore of the body of the lower support cap; and
      a second annular lip arranged on an internal edge of the vibration-filtering element and extending radially inwards in the direction of the cup so as to form a gap seal for reducing any ingress of polluting elements inside a radial gap defined between the axial bore of the lower support cap and the cup.

2. The device of claim 1, wherein the first annular lip extends radially beyond the periphery of the body of the lower support cap.

3. The device of claim 1, wherein the vibration-filtering element comprises an axial portion for the centering of the suspension spring.

4. The device of claim 3, wherein the second annular lip has a bore diameter which is less than a bore diameter of the lower support cap.

5. The device of claim 1, wherein the vibration-filtering element is obtained by molding at least one synthetic material.

6. The device of claim 1, wherein the radial dimension of the first annular lip is substantially equal to that of the radial portion.

7. A strut comprising a damper rod and a suspension thrust bearing device, the suspension thrust bearing device comprising:

a rolling bearing forming an axial thrust bearing, a lower support cap of the rolling bearing that is provided with a body made of synthetic material having an axial bore, a vibration-filtering element mounted on the body of the lower support cap, the vibration-filtering element being made of flexible plastic material to filter the vibrations of a suspension spring, and wherein the vibration-filtering element comprises:

a radial portion forming a bearing surface for an upper end of the suspension spring;

a first annular lip extending substantially radially outwardly from the bearing surface of the radial portion and beyond the upper end of the suspension spring and the body of the lower support cap, said annular lip extending entirely around the periphery of said body of the lower support cap and said upper end of the suspension spring and being designed to form a flow deflector for reducing any ingress of water inside the rolling bearing;

a cup provided within the axial bore of the body of the lower support cap; and a second annular lip arranged on an edge of an axial portion of the vibration-filtering element and extending radially inwards in the direction of the cup so as to form a gap seal for reducing any ingress of polluting elements inside a radial gap defined between the axial bore of the lower support cap and the cup.

8. The strut of claim 7, wherein the first annular lip extends radially beyond the periphery of the body of the lower support cap.

9. The strut of claim 7, wherein the second annular lip has a bore diameter which is less than a bore diameter of the lower support cap.

10. The strut of claim 7, wherein the radial dimension of the first annular lip is substantially equal to that of the radial portion.

* * * * *